(12) United States Patent
Veit (10) Patent No.: US 10,041,295 B2
(45) Date of Patent: Aug. 7, 2018

(54) WINDING DEVICE FOR COVERING OF BUILDING OPENINGS

(71) Applicant: Lock Antriebstechnik GmbH, Ertingen (DE)

(72) Inventor: Christoph Veit, Weiler (DE)

(73) Assignee: Lock Antriebstechnik GmbH, Ertingen (DE)

( * ) Notice: Subject to any disclaimer, the term of this patent is extended or adjusted under 35 U.S.C. 154(b) by 6 days.

(21) Appl. No.: 14/935,697

(22) Filed: Nov. 9, 2015

(65) Prior Publication Data

US 2016/0130873 A1    May 12, 2016

(30) Foreign Application Priority Data

Nov. 10, 2014   (DE) .................... 20 2014 105 368 U (51) Int. Cl.
| | |
|---|---|
| *A47G 5/02* | (2006.01) |
| *E06B 9/68* | (2006.01) |
| *E06B 9/40* | (2006.01) |
| *E06B 9/70* | (2006.01) |
| *E06B 9/64* | (2006.01) |
| *A01K 1/00* | (2006.01) |

(Continued)

(52) U.S. Cl.
CPC ............ *E06B 9/68* (2013.01); *A01K 1/007* (2013.01); *E06B 9/40* (2013.01); *E06B 9/64* (2013.01); *E06B 9/70* (2013.01); *E06B 9/78* (2013.01); *E06B 2009/2452* (2013.01); *E06B 2009/2458* (2013.01); *E06B 2009/405* (2013.01)

(58) Field of Classification Search
CPC ..... E06B 9/68; E06B 9/40; E06B 9/64; E06B 9/66; E06B 2009/405; E06B 2009/2452; E06B 2009/2458; E06B 2009/2447; E06B 2009/2441

USPC .................................................. 160/241–261
See application file for complete search history.

(56) References Cited

U.S. PATENT DOCUMENTS

| | | | | |
|---|---|---|---|---|
| 669,321 | A * | 3/1901 | Holwager | E06B 9/40 |
| | | | | 160/121.1 |
| 1,003,045 | A * | 9/1911 | Hartsought | E06B 9/40 |
| | | | | 160/121.1 |

(Continued)

FOREIGN PATENT DOCUMENTS

| | | | | |
|---|---|---|---|---|
| AT | 401801 B | * 12/1996 | | E06B 9/24 |
| CA | 2767466 A1 | * 1/2011 | | E06B 9/40 |

(Continued)

OTHER PUBLICATIONS

European Search Report (Application No. 15192675.5) dated Dec. 16, 2015.

*Primary Examiner* — Katherine W Mitchell
*Assistant Examiner* — Johnnie A. Shablack
(74) *Attorney, Agent, or Firm* — Burr & Brown, PLLC (57) ABSTRACT

A winding device for the covering of building openings, comprising a sheetlike, flexible cover element for at least partial covering of the at least one building opening and a winding element driven by a drive unit for adjusting a cover surface of the covering, wherein the cover element can be wound and unwound with the winding element. According to the invention, in addition to a first cover element, there is provided a second cover element), which can be arranged overlapping with the first cover element in the covering state, wherein the cover elements can be wound and unwound with a winding element.

12 Claims, 4 Drawing Sheets

(51) Int. Cl.
*E06B 9/78* (2006.01)
*E06B 9/24* (2006.01)

(56) References Cited

U.S. PATENT DOCUMENTS

| | | | | |
|---|---|---|---|---|
| 1,113,181 A * | 10/1914 | Ardito | ...... | E06B 9/50 |
| | | | | 160/242 |
| 1,158,613 A * | 11/1915 | Williams | ...... | E06B 9/40 |
| | | | | 160/241 |
| 1,307,729 A * | 6/1919 | Dunlop | ...... | E06B 9/40 |
| | | | | 160/121.1 |
| 1,452,611 A * | 4/1923 | Lunken | ...... | E06B 9/80 |
| | | | | 160/122 |
| 1,469,133 A * | 9/1923 | Wolfe | ...... | E06B 9/66 |
| | | | | 160/384 |
| 1,469,150 A * | 9/1923 | Church | ...... | E06B 9/66 |
| | | | | 160/121.1 |
| 1,486,678 A * | 3/1924 | Peters | ...... | E06B 9/66 |
| | | | | 160/241 |
| 1,525,477 A * | 2/1925 | Vroble | ...... | E06B 9/64 |
| | | | | 160/111 |
| 1,637,798 A * | 8/1927 | Batts | ...... | E06B 9/64 |
| | | | | 160/248 |
| 1,786,084 A * | 12/1930 | Phinn | ...... | E06B 9/64 |
| | | | | 160/253 |
| 1,805,941 A * | 5/1931 | Eveleth | ...... | E06B 9/58 |
| | | | | 160/255 |
| 1,870,920 A * | 8/1932 | McNulty | ...... | E06B 9/64 |
| | | | | 160/244 |
| 2,225,280 A * | 12/1940 | Sample | ...... | E06B 9/50 |
| | | | | 160/265 |
| 2,281,022 A * | 4/1942 | Cavanaugh | ...... | A47H 23/06 |
| | | | | 160/237 |
| 2,660,659 A * | 11/1953 | Sarno | ...... | F24C 7/043 |
| | | | | 160/127 |
| 3,306,344 A * | 2/1967 | Youngs | ...... | E06B 9/40 |
| | | | | 160/241 |
| 3,398,779 A * | 8/1968 | Kuss | ...... | E06B 9/40 |
| | | | | 160/243 |
| 3,464,480 A * | 9/1969 | Kuss | ...... | A47H 13/01 |
| | | | | 160/243 |
| 3,521,693 A * | 7/1970 | Kuss | ...... | A47H 5/00 |
| | | | | 160/243 |
| 3,693,695 A * | 9/1972 | Deane | ...... | E06B 9/171 |
| | | | | 160/243 |
| 3,980,122 A * | 9/1976 | Takazawa | ...... | E06B 9/64 |
| | | | | 160/120 |
| 3,990,635 A * | 11/1976 | Restle | ...... | E06B 9/24 |
| | | | | 126/591 |
| 4,237,956 A * | 12/1980 | Sivin | ...... | E06B 9/40 |
| | | | | 126/569 |
| 4,298,048 A * | 11/1981 | Roller | ...... | E06B 9/64 |
| | | | | 160/243 |
| 4,326,577 A * | 4/1982 | Tse | ...... | E06B 9/40 |
| | | | | 160/259 |
| 4,433,711 A * | 2/1984 | Lew | ...... | E06B 9/40 |
| | | | | 160/120 |
| 4,480,675 A * | 11/1984 | Berkemeier | ...... | B60R 5/047 |
| | | | | 160/121.1 |
| 4,574,864 A * | 3/1986 | Tse | ...... | E06B 9/64 |
| | | | | 160/259 |
| 4,800,946 A * | 1/1989 | Rosenoy | ...... | E06B 9/40 |
| | | | | 160/133 |
| 4,987,942 A * | 1/1991 | Eriksson | ...... | B60J 5/067 |
| | | | | 160/122 |
| 5,195,594 A * | 3/1993 | Allen | ...... | A62C 2/10 |
| | | | | 160/243 |
| 5,383,510 A * | 1/1995 | Allen | ...... | A62C 2/10 |
| | | | | 160/243 |
| 5,429,171 A * | 7/1995 | Hamilton | ...... | E06B 9/64 |
| | | | | 160/122 |
| 5,520,236 A * | 5/1996 | Thomas | ...... | A01G 9/227 |
| | | | | 160/120 |
| 5,524,693 A | 6/1996 | Hamilton | | |
| 5,566,736 A * | 10/1996 | Crider | ...... | E06B 9/13 |
| | | | | 160/121.1 |
| 5,682,937 A * | 11/1997 | Decrane | ...... | E06B 39/13 |
| | | | | 160/133 |
| 5,752,557 A * | 5/1998 | Crider | ...... | E06B 9/13 |
| | | | | 160/121.1 |
| 5,785,105 A * | 7/1998 | Crider | ...... | E06B 9/13 |
| | | | | 160/243 |
| 5,819,835 A * | 10/1998 | Broome | ...... | E06B 9/13 |
| | | | | 160/243 |
| 5,911,467 A * | 6/1999 | Evans | ...... | B60J 5/067 |
| | | | | 160/120 |
| 5,960,847 A * | 10/1999 | Crider | ...... | E06B 9/13 |
| | | | | 160/121.1 |
| 5,966,854 A * | 10/1999 | Walsh | ...... | G09F 11/29 |
| | | | | 160/243 |
| 6,138,739 A * | 10/2000 | Crider | ...... | E06B 9/64 |
| | | | | 160/273.1 |
| 6,155,326 A * | 12/2000 | Imhoff | ...... | E06B 9/58 |
| | | | | 160/243 |
| 6,273,813 B1 * | 8/2001 | Arntjen | ...... | A01K 1/0047 |
| | | | | 119/448 |
| 6,401,794 B1 | 6/2002 | Hamilton | | |
| 6,557,613 B2 * | 5/2003 | Schmidt | ...... | E06B 9/42 |
| | | | | 160/245 |
| 6,612,359 B1 * | 9/2003 | Moreau | ...... | A01K 1/007 |
| | | | | 160/120 |
| 6,848,491 B2 * | 2/2005 | Gambarelli | ...... | B65G 1/02 |
| | | | | 160/122 |
| 6,942,001 B1 * | 9/2005 | Crider | ...... | E06B 9/42 |
| | | | | 160/241 |
| 7,028,742 B2 * | 4/2006 | Sears | ...... | E06B 9/13 |
| | | | | 160/243 |
| 7,059,377 B2 * | 6/2006 | Nien | ...... | E06B 9/42 |
| | | | | 160/120 |
| 7,152,653 B1 * | 12/2006 | Kubly | ...... | E06B 9/40 |
| | | | | 160/120 |
| 7,299,848 B2 * | 11/2007 | Streib | ...... | A62C 2/247 |
| | | | | 160/243 |
| 7,624,783 B2 * | 12/2009 | Sensenig | ...... | A47H 7/02 |
| | | | | 160/120 |
| 7,624,784 B2 * | 12/2009 | Anthony | ...... | E06B 9/40 |
| | | | | 160/120 |
| 7,735,539 B2 * | 6/2010 | Nakamura | ...... | A62C 2/10 |
| | | | | 160/243 |
| 7,828,037 B2 * | 11/2010 | Crider | ...... | E06B 7/232 |
| | | | | 160/121.1 |
| 8,418,741 B2 * | 4/2013 | Cheung | ...... | E06B 9/42 |
| | | | | 160/241 |
| 8,439,099 B1 * | 5/2013 | Crider | ...... | E06B 9/13 |
| | | | | 160/121.1 |
| 8,459,329 B2 * | 6/2013 | Connerley | ...... | E06B 9/44 |
| | | | | 160/120 |
| 8,733,420 B2 * | 5/2014 | Craney | ...... | E06B 9/08 |
| | | | | 160/241 |
| 8,763,674 B2 * | 7/2014 | Kataoka | ...... | E06B 9/262 |
| | | | | 160/120 |
| 8,800,632 B2 * | 8/2014 | Cooper | ...... | A62C 2/10 |
| | | | | 160/120 |
| 8,807,192 B2 * | 8/2014 | Marocco | ...... | A47H 23/00 |
| | | | | 160/120 |
| 8,820,387 B2 * | 9/2014 | Zettl | ...... | E06B 9/66 |
| | | | | 160/244 |
| 8,887,787 B2 * | 11/2014 | Jang | ...... | E06B 9/42 |
| | | | | 160/120 |
| 8,905,830 B2 * | 12/2014 | Schmelzer | ...... | A01K 1/007 |
| | | | | 454/337 |
| 8,919,415 B1 * | 12/2014 | Crider | ...... | E06B 9/42 |
| | | | | 160/241 |
| 9,226,458 B2 | 1/2016 | Niederer | | |
| 9,259,833 B2 * | 2/2016 | Bonini | ...... | E06B 9/42 |
| 9,366,081 B2 * | 6/2016 | Howie | ...... | E06B 9/42 |
| 9,371,688 B2 * | 6/2016 | Cavarec | ...... | E06B 9/64 |
| 9,556,672 B2 * | 1/2017 | Pfaff | ...... | E06B 9/13 |
| 9,637,974 B2 * | 5/2017 | Thompson | ...... | A62C 2/10 |

(56) References Cited

U.S. PATENT DOCUMENTS

| | | | |
|---|---|---|---|
| 2003/0051829 A1* | 3/2003 | Sears | E06B 9/13 160/243 |
| 2005/0241779 A1* | 11/2005 | Abouloukme | A01G 9/227 160/122 |
| 2006/0027339 A1* | 2/2006 | Hsu | E06B 9/40 160/120 |
| 2009/0277593 A1* | 11/2009 | Stewart | E06B 9/40 160/127 |
| 2010/0037522 A1* | 2/2010 | Wirth | E06B 3/80 49/31 |
| 2010/0236492 A1 | 9/2010 | Calabrese | |
| 2011/0036519 A1* | 2/2011 | Doogan | E06B 9/40 160/368.1 |
| 2013/0098563 A1* | 4/2013 | Jang | E06B 9/42 160/120 |
| 2014/0166218 A1* | 6/2014 | Ng | E06B 9/42 160/120 |
| 2015/0129140 A1* | 5/2015 | Dean | E06B 9/24 160/5 |
| 2016/0222726 A1* | 8/2016 | Rupel | E06B 9/66 |

FOREIGN PATENT DOCUMENTS

| | | | | |
|---|---|---|---|---|
| CA | 2831949 A1 | * | 5/2014 | E06B 9/40 |
| CA | 2930432 A1 | * | 5/2015 | E06B 9/66 |
| CA | 2831949 C | * | 5/2016 | E06B 9/40 |
| DE | 19834081 A1 | * | 2/2000 | A01G 9/227 |
| DE | 102012022001 A1 | * | 5/2014 | E06B 9/40 |
| DE | 102013114674 A1 | * | 7/2014 | E06B 9/42 |
| EP | 0982466 A1 | * | 3/2000 | A01G 9/227 |
| EP | 1484470 A1 | * | 12/2004 | E06B 9/42 |
| EP | 1522671 A2 | * | 4/2005 | E06B 9/40 |
| EP | 2020479 A2 | * | 2/2009 | E06B 9/40 |
| EP | 1522671 B1 | * | 2/2012 | E06B 9/40 |
| EP | 2471356 A1 | * | 7/2012 | A01G 9/227 |
| EP | 2 730 738 A1 | | 5/2014 | |
| EP | 2730738 A1 | * | 5/2014 | E06B 9/40 |
| WO | WO 2005010313 A1 | * | 2/2005 | A01K 1/007 |
| WO | WO 2008004805 A1 | * | 1/2008 | A47H 23/06 |
| WO | WO 2014197253 A2 | * | 12/2014 | E06B 9/42 |
| WO | WO 2015012624 A1 | * | 1/2015 | E06B 9/40 |
| WO | WO 2015018234 A1 | * | 2/2015 | E06B 9/40 |
| WO | WO 2014197253 A3 | * | 5/2015 | E06B 9/42 |

* cited by examiner

WINDING DEVICE FOR COVERING OF BUILDING OPENINGS

This application claims the benefit under 35 USC § 119(a)-(d) of German Application No. 20 2014 105 368.9 filed Nov. 10, 2014, the entirety of which is incorporated herein by reference.

FIELD OF THE INVENTION

The present invention relates to a winding device for covering of building openings or for providing flexible walls.

BACKGROUND OF THE INVENTION

Devices such as winding blinds for the changeable determination of a cover region of a surface structure are known, in which at least partial winding and unwinding of the surface structure with the nonwound part of the surface structure determines the cover surface.

With such winding devices, one can provide variable blinds, walls or shade systems. A tarpaulin or plastic sheet can be considered as the sheetlike, windable or flexible cover element, for example.

Such arrangements are often used in agriculture, for example, in order to regulate a light, air, and/or heat situation in farm stables, greenhouses or storerooms. The devices with the cover element are arranged in particular at building openings in order to cover or open them.

When used outdoors, harsh surrounding conditions must often be expected. Furthermore, large-area applications place relatively large demands on the winding system, for example, due to the high static and dynamic loads occurring, which are caused by the gravity forces at play or weather-related wind or snow loads.

Moreover, easily installed and economical solutions are of central importance to large-size applications.

SUMMARY OF THE INVENTION

The problem of the present invention is to improve the above-mentioned arrangements so as to advantageously fulfill the aforementioned chief requirements on the respective systems.

The present invention is based on a winding device for the covering of building openings or for the providing of flexible walls, especially for an essentially vertical application, comprising a sheetlike, flexible cover element for at least partial covering of the at least one building opening and a winding element driven by a drive unit for adjusting a cover surface of the covering, wherein the cover element can be wound and unwound with the winding element. The cover element can be, for example, a tarpaulin or plastic sheet, such as are used in agriculture, for example.

A building opening can be, for example, an opening at a vertical or slanting section of a building, such as an outer wall or a ceiling surface, for example that of a greenhouse or a stable.

The drive element is preferably a drive motor, such as an electric motor. Alternatively or additionally, a manual drive by means of a crank arrangement, for example, is also possible.

The crux of the invention is that in addition to a first cover element there is provided a second cover element, which can be arranged overlapping with the first cover element in the covering state, wherein the cover elements can be wound and unwound with a winding element. This is advantageous especially in regard to different surrounding conditions in terms of a robust application and for adapting the covering to different operating situations. Furthermore, the providing of a further cover element is advantageous in terms of supplementing the existing system with the first cover element, since the same basic requirements hold for the second cover element and thus they can be integrated in the system with no problem.

The two cover elements are effective in themselves as separate components, and thus have nothing to do with a two-layered composite cover element in particular.

In particular, the two cover elements are so configured in their function that they provide a covering function corresponding to a single windable and unwindable cover element when the other cover element is omitted. The overlapping of the two cover elements is to be seen in a direction perpendicular to a plane spanning the building opening, so that in this direction the two cover elements are arranged one behind the other.

The two cover elements can be identical in nature or different, in particular, the two cover elements are comparable or identical, especially in their mechanical or flexibility properties.

Advantageously, the drive unit is positioned stationary. This can be, for example, on a building wall or a ceiling surface near a building opening. The winding element is oriented preferably horizontally, in particular, able to be deflected slightly about a given position, in addition to being able to rotate about its own lengthwise axis. The winding element can be suspended, for example, at the edge of a cover element and be able to move slightly upward and horizontally.

Moreover, it is advantageous for the two cover elements to be arranged one behind the other in an unwound state, so that the two cover elements overlap with a spacing. The overlapping with a spacing is relative to a resting or equilibrium state of the cover elements. The spacing so formed between the two cover elements is in particular dictated by the design.

For the advantageous functioning of the device according to the invention, an overlapping producing a spacing between the two cover elements should therefore be established.

The spacing brings various advantages. With the spacing, an intermediate space free of material can be formed advantageously between the two cover elements, generally being an air gap. The air gap can permanently ensure in particular a temperature of the two cover elements which is above the water freezing point. Thus, for example, when ambient temperatures are low, such as for outdoor uses in winter or in polar regions, or when used in cold storerooms, a freezing of the cover elements to neighboring surfaces can be prevented, especially the forming of an ice layer on the cover elements. In this way, one can advantageously avoid functional disturbances with the arrangement of the invention, such as regularly occur otherwise, for example, if a winding or unwinding of the cover element having a layer of ice is hindered or made impossible.

The spacing provides a space which can be separated at least essentially from the outside between the respective inner sides of the cover elements, which can preferably be heated. The volume or minimum volume per cover area that is needed for a desired temperature behavior can be easily established by the design-dictated spacing of the two overlapping cover elements.

The two cover elements form between them a temporary intermediate or thermal layer, which is only present in the unwound state between the two cover elements. Advantageously, the intermediate space vanishes entirely in the wound-up state, which is advantageous, since the coil formed from the wound-up material of the cover elements on the winding element is minimal in diameter. The air to be displaced in the intermediate region upon winding up the cover elements can escape for example to the sides at the edge of the cover elements and outside to the surroundings. In particular, the increase in diameter of the coil on the winding element as compared to a single cover element is in a relatively small and tolerable range as compared to the previous arrangement with just one cover element, but for which the discussed drawbacks occur at low temperatures.

The two cover elements are advantageously spanned by the spacing over the entire or nearly the entire unwound extent and thus are correspondingly effective.

The spacing of the two unwound cover element from each other can advantageously be design dictated without specially provided spacing means. Alternatively or additionally, corresponding means can be provided, such as spacers.

Advantageously, at least one cover element is configured at least essentially transparent, so that in outdoor applications light or solar radiation can penetrate through the transparent cover element. In this way, sunbeams can warm the region of the material-free spacing between the cover elements. Accordingly, it is advantageous in particular for the outer cover element, or the one further removed from the building opening, to be transparent. The inner cover element can be transparent or reflective and in particular it is insulating, so as to minimize heat loss from the intermediate region to the outside. Thus, significant fractions of the thermal energy remain captured within the region of the spacing between the two cover elements, so that this region has a higher temperature than the surroundings in the case of relatively low ambient temperatures of below zero degrees Celsius. An icing of the cover elements and thus a stiffening, which makes it impossible to wind and unwind them, or a freezing of the cover elements to neighboring sections or cold surfaces can be advantageously prevented.

The two cover elements are separated from each other or spaced apart between an upper and a lower edge of the cover element, especially for the entire respective surface or their inner sides. The spacing can be, for example, in the range of one centimeter or up to several centimeters.

The winding element is in particular an elongated profile able to turn with the drive unit in both directions about is lengthwise axis, such as a winding shaft or a hollow winding pipe. The winding element advantageously corresponds in its length to the overall width of the cover elements. The drive unit is joined to the winding element at its side, especially in the axial extension of the winding element, via a torque transmission unit, optionally displaced somewhat vertically to the axis of the winding element.

Besides this, it is advantageous for a lower edge of the first cover element and a lower edge of the second cover element to grasp a common winding element. This is an especially compact, simple and material-sparing arrangement. The two cover elements can be fastened to the winding element on the outside by their respective lower edge along the length of the winding element, for example being separated along a half outer circumference of the winding element. Even in the unwound state, the two cover elements are stretched taut and free of folds by the weight of the winding element and the lower edges are stabilized against unwanted fluttering and folding.

Alternatively, it is possible for a lower edge of the first cover element to grasp a first winding element and a lower edge of the second cover element to grasp a second winding element. In this way, both cover elements can be wound and unwound by their own designated or separate winding element. This can be advantageous in regard to an especially flexible arrangement of the covering. In particular, the position of the respective lower edge of the completely unwound cover elements can be dictated by means of the respective winding element, for example, being somewhat displaced from each other horizontally and/or vertically.

The two winding elements can preferably be driven by a common drive unit.

One advantageous modification is characterized in that an upper edge of the first cover element and an upper edge of the second cover element grasp a common mounting. This provides a simple and compact system. In particular, the respective upper edges of the two cover elements are fixed to an elongated profile, such as a continuous rail, a rod or a pipe. Optionally, the upper edges of the two cover elements can be joined together or the two cover elements are joined together continuously at the top.

It is also advantageous for the two cover elements to have essentially the same dimensions. In this way, the entire building opening being closed or the entire flexible wall is formed or covered overlapping with the two cover elements. Thus, the spacing between the two cover elements can be established along the entire surface of the cover elements, so that the advantages dictated by the spacing can be achieved over the entire surface serviced by the winding device.

In particular, the two cover elements have the same length, height and width. The material and the thickness of the two cover elements may match up or be different.

Moreover, it is advantageous that the two cover elements be coordinated with each other in terms of the light transparency and/or reflectivity. In particular, the two cover elements are of different quality in regard to transparency or reflection of sunbeams or light.

In this way, it is especially advantageously possible to allow incident light beams or solar energy to pass through an outside cover element, while the further cover element reflects the incoming light beams or solar energy. In this way, an energy content in the intermediate or spacing region between the two overlapping cover elements is increased by sunlight or also artificial light, so that the temperature rises in the intermediate region and the air present in the intermediate region is warmed.

It is furthermore advantageous to provide two winding elements, which are staggered relative to each other in vertical and/or in horizontal direction when the cover elements are fully unwound. This can be advantageous for spatial considerations and/or design. With the horizontal offset between the winding elements, the spacing between the overlapping cover elements can be influenced.

The two winding elements are advantageously of the same kind. For example, the two winding shafts can have the same length and the same diameter.

It is also advantageous that the connection between drive unit and winding element is designed such that a changing of the vertical height position of the winding element can be balanced out during the winding process. For example, the lower edge of the first cover element and the lower edge of the second cover element may deviate in the vertical and/or horizontal direction. For example, due to the different coil diameter during the winding and unwinding of the cover element, the winding element may be displaced somewhat from a vertically determined position, which can be equalized by the adjustable connection, so that a relevant folding is prevented and no unwanted strong tensile stresses are acting on the cover element, which may prevent any resulting damage to the cover element.

For example, a telescopically articulated coupling can be used advantageously between one winding element and the drive unit.

This enables a slight adjusting motion of the winding shaft toward the building opening or away from it, vertically upward or downward, while the drive unit is in fixed position.

Another advantageous embodiment of the invention is characterized in that the winding elements can be driven in rotation with a drive unit across a transfer box operating between the drive unit and the winding elements. In particular, precisely one drive unit is provided as the rotary drive for both winding elements. In particular, a transfer box is provided with or without step-up or step-down gearing, which is connected at an input side to an output shaft segment of the drive unit and has at an output side two rotating shaft segments, each of which is connected via a telescopic coupling for example to one of the two winding elements. The respective rotary speed of the two shaft segments of the transfer box rotating at the output side is the same, so that the two winding elements also turn with the same rotary speed.

Alternatively, the transfer box can be connected to one end of a telescopic coupling at the input side, while the other end of the telescopic coupling is connected to the output shaft segment of the drive unit. At the output side of the transfer box, the rotating shaft segments are each connected without rotation to a corresponding winding element. The transfer box is advantageously mounted overhung.

This also enables a flexible adjusting of the height position of the two winding elements during a winding process.

Another advantageous variant of the invention is characterized in that a tracking unit is provided, which tracks the upper edge of the cover elements according to the progress of the winding process. In particular, a tracking unit is provided which tracks the upper edges of the two cover elements situated at the same height. If, for example, starting from a completely covered building opening, the cover elements are wound up from the bottom, the upper edges will be lowered in accordance with the progress of the winding process so that the coil with the one winding element or the two winding elements does not change vertically, or does so only slightly. In this way, there is provided a winding device which opens at the top, while the building opening remains closed at the bottom. When closing the building opening by unwinding the cover elements from the bottom down, the upper edges of the cover elements are moved upward with the tracking unit, in keeping with the unwinding process.

The tracking unit can also essentially provide for other scenarios, for example a process in which the covered building opening is opened from the bottom and also at the same time from the top.

Winding devices without tracking unit are also conceivable.

Likewise, winding devices are possible which open at the top, while the building opening remains covered at the bottom. Here, the covered building opening is opened downward from the upper edge by the cover element being wound up at the top, while the lower edge of the building opening remains closed or remains covered by the lower region of the cover element.

The tracking unit advantageously comprises in particular a plurality of windable tension elements, which are connected by one end to an upper edge of the two cover elements. In particular, two or more tension elements are provided for lifting the upper edges of the two cover elements, while the other ends of the tension elements can be wound and unwound with at least one driven rotating winding body. In this way, the upper edges of the cover elements are moved vertically or raised or lowered without themselves being wound or unwound.

The at least one winding body can advantageously be driven in rotation with the same drive unit that drives in rotation the two winding elements, for example.

Moreover, it is advantageous that the winding element be connected to an upper partial region of a corresponding cover element and a lower partial region of the corresponding cover element so that both partial regions of the cover element can be wound and unwound jointly with the winding element. This advantageously provides for a faster or double winding, as compared to one revolution of a winding element, since both partial regions are wound or unwound at the same time. This involves, e.g., a so-called middle winding.

In particular, it is advantageous for both cover elements to be realized as a middle winding.

Moreover, it is advantageous for a cover element to be able to be heated at least for partial areas. The heating can be electrical, in particular, and is especially advantageous in regard to an arrangement of the winding device in an environment in which temperatures below the freezing point occur, such as outdoor layouts which are exposed to low temperatures depending on the time of year or the time of day.

In particular, the cover element has corresponding heating elements on the cover element itself. In particular, in the case of the two cover elements, at least the cover element which is closer to the building opening will be heated. In particular, striplike heating elements or elements extending horizontally across a width of the cover element are advantageous for this. Free areas can be present in between on the respective cover elements, such as areas transparent to or reflecting of thermal radiation or light.

Moreover, it is advantageous for a cover element closer to the building opening to be reflective, especially to reflect thermal radiation. In this way, solar radiation passing through the front cover element, further removed from the building opening, is reflected at the second rear cover element and thrown back into the inner region between the two overlapping cover elements, so that the intermediate region or air gap is heated. A heat loss from the inside or a region between the overlapping cover elements to the outside is lessened. This hinders a freezing of the cover elements to other segments, such as moist surfaces, and counteracts a formation of an ice layer on the cover elements.

Finally, it is also advantageous for the winding element to be heatable. For example, the winding element can be designed as a heating pipe, for example one filled with or receiving a flow of a warm heat transfer agent. Furthermore, a heating hose can be led through a hollow winding element, receiving the flow of a warm liquid and thus heating the air gap between the overlapping cover elements.

BRIEF DESCRIPTION OF THE DRAWINGS

Further features and advantages are explained by means of various sample embodiments of the invention shown schematically in the figures

DETAILED DESCRIPTION OF THE INVENTION

In the figures at times the same reference numbers are used for corresponding elements of different sample embodiments of the invention.

Figure 1:
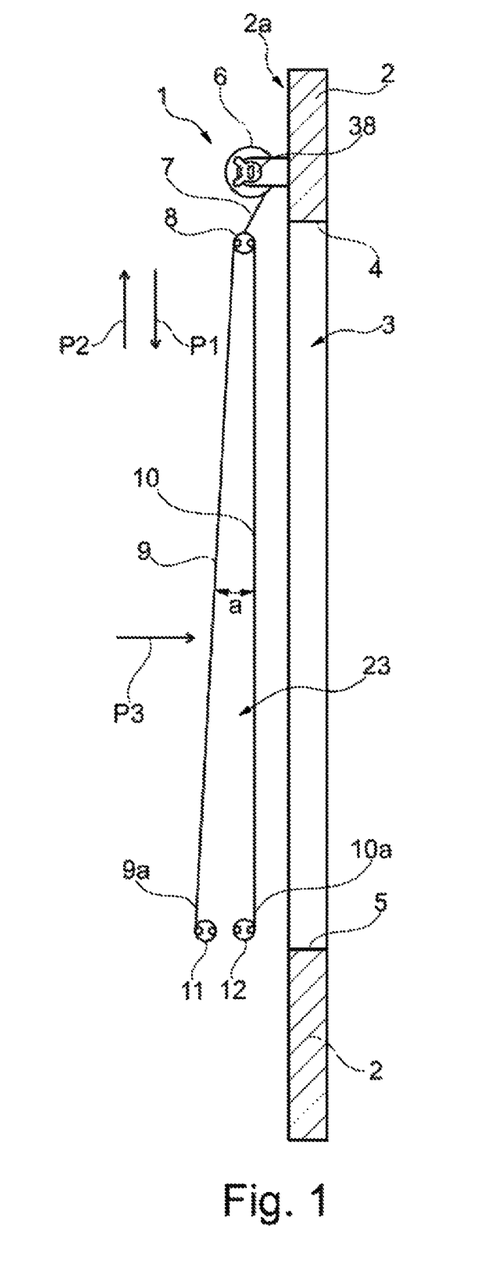
FIG. 1 shows a first winding device according to the present invention from the side on a building wall, shown in section view.

FIG. 1 shows part of a winding device according to the invention, shown highly schematized representation as a winding blind 1, from the side in vertical section, for covering a building opening 3 at a vertically oriented building wall 2. The winding blind 1 present on the outside at the building wall 2 serves for at least partial outside covering or clearing of the building opening 3, depending on the winding state of the winding blind 1. The building wall 2 can be, for example, an outer wall of a stable or a greenhouse, where an entry of light and heat into the interior of the building and a temperature adjustment inside the building and an exchange of air with the outside is possible through the building opening 3, depending on the size of the area of the building opening 3 covered with the winding blind 1.

The building opening 2, especially one which is rectangular in basic shape, has two opposite vertically oriented opening edges, spaced apart by the width of the opening, and an upper opening edge 4 across the height of the building opening 2 and a lower opening edge 5, which run parallel and horizontal.

The winding blind 1 has on an outer side 2a of the building wall 2 above the upper opening edge 4 for example two or more mounted winding bodies, which lie at a common horizontal height and are accommodated for example jointly on a horizontally rotating round profile 38. In FIGS. 1 to 4, each time only one drumlike winding body 6 able to turn about the horizontal axis can be seen.

One end of a tension element 7 such as a cord or a wire cable is attached to the winding body 6 and can be wound and unwound by a powered rotation of the winding body 6. For this, the winding body 6 can be driven in rotation with the round profile 38 across a drive (see FIG. 9).

Another end of the tension element 7 is secured above to an elongated rigid support pipe 8. Furthermore, the upper edges of two cover elements are connected to the horizontally oriented support pipe 8, being fashioned as flexible sheets 9 and 10 of the same size. The front sheet 9 and the rear sheet 10 are shown entirely unwound in FIG. 1 and they have a vertical height which roughly corresponds to the height of the building opening 3. The width of the sheets 9, 10 roughly corresponds to the width of the building opening 3.

FIG. 1 shows the winding blind 1 in the totally unwound state of the sheets 9 and 10, which overlap across the entire area of the building opening 3 with a spacing, so that the building opening 3 is covered over the entire area of the two sheets 9 and 10 arranged with a spacing in the horizontal direction P3 or one behind the other. A spacing a measured in the horizontal direction P3 at mid height between the two sheets 9 and 10 differs only slightly from a spacing between the sheets 9 and 10 above and below the mid height of the two sheets 9, 10, while the representation in FIG. 1 is not true to scale and the two sheets 9, 10 in reality are oriented almost parallel to each other.

A lower edge 9a of the sheet 9 is joined across the entire width to a corresponding winding element, which is fashioned as a hollow winding shaft 11. Under the natural weight of the winding shaft 11, the sheet 9 is held spread out and taut, with no folding.

In corresponding manner, a lower edge 10a of the sheet 10 is connected to another winding element fashioned as a winding shaft 12. The winding shafts 11 and 12 are situated at the same height one behind the other and in particular are of the same or identical configuration.

A winding and unwinding of the two sheets 9, 10 occurs simultaneously and accordingly, while the winding shafts 11, 12 are driven at the same time with the same rotary speed and direction of turning by a drive unit (see FIGS. 5-8) and rotate about their respective lengthwise axis. Starting from the completely unwound state per FIG. 1, the two sheets 9 and 10 are thus wound up onto the winding shafts 11 and 12. In order for the building opening 3 during this opening operation to remain covered or closed at its lower opening edge 5 and to open solely from the upper opening edge 5, the winding body 6 as well as a further winding body, for example, is turned accordingly with a tension element, here, clockwise for example, so that a wound-up part of the tension element 7 is unwound from the winding body 6 to the degree that the sheets 9, 10 are wound up. As a result, the winding shafts 11 and 12 remain at least essentially at the lower opening edge 5 at the same height position as shown in FIG. 1.

Since as the winding process continues the coil formed on the winding shafts 11 and 12 from the wound-up sections of the sheets 9 and 10 increases in outer diameter and therefore for the same rotary speed of the winding shafts 11, 12 per unit of time a winding power of the winding shafts increases, telescopic couplings are provided for example between the drive motor and the winding shafts 11, 12. Alternatively, steps can be taken so that the tension element 7 is unwound more quickly to the same degree as the ongoing unwinding process of the sheets 9, 10 or the unwound length of the tension element 7 per unit of time increases. A telescopic coupling can then be omitted as an option. Preferably then, a coordinated external conical shape of the winding body 6 can be provided, on which the tension element 7 is wound according to the state of FIG. 1 or along which the tension element can be wound and unwound.

By corresponding rotation of the winding body 6, the support pipe 8 descends in the direction of lowering P1, so that the building opening 3 is increasingly cleared of the sheets 9, 10 starting from the upper opening edge 4. At the end of the opening process, the sheets 9, 10 are completely wound onto the winding shafts 11, 12, and the tension element 7 is unwound from the winding body 6, i.e., it extends vertically from the top, above the height of the building opening 3, to the bottom. The support pipe 8 is located next to and above the two coils of the winding shafts 11, 12. The support pipe 8 and the two coils are located in the region in front of the lower opening edge 5.

By halting the rotation of the winding body 6 or the corresponding round profile 38 and the winding shafts 11, 12 at corresponding moments of time, it is possible to dictate every possible opening position of the winding blind 1, so that the size of the building opening 3 cleared of the sheets 9, 10 can be adjusted as desired.

By reversing the directions of rotation of the winding body 6 and the round profile 38 and the winding shafts 11, 12 as opposed to the opening process described above, the opposite closing process occurs, in which the support pipe 8 moves upward in the opening direction per P2, since the tension element 7 is wound up by the winding body 6, and the sheets 9, 10 engaging with it are pulled upward, at the same time being unwound by each of the winding shafts 11, 12 from the wound-up portion of the two coils.

The support pipe 8 does not rotate in the winding blind 1, and accordingly there is no winding or unwinding of the upper edges of the sheets 9 and 10, but only a translatory vertical upward and downward movement of the support pipe 8.

Figure 2:
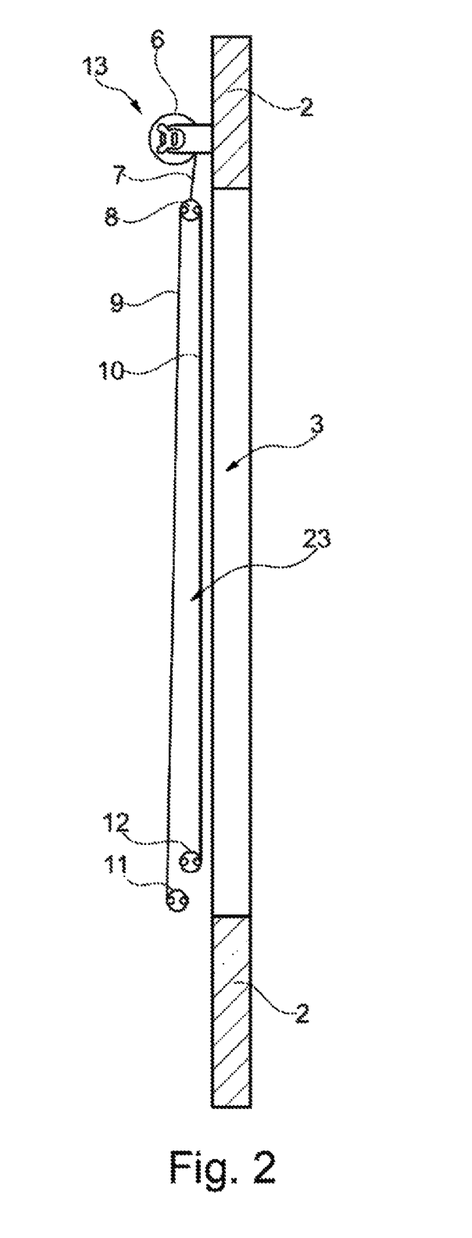
FIG. 2 shows an alternative winding device according to the present invention per the view from FIG. 1.

FIG. 2 shows an alternative winding blind 13 according to the invention, which differs from the winding blind 1 in that in the fully unwound state of the sheets 9 and 10 the rear winding shaft 12 in direction P3 is positioned slightly above the front winding shaft 11. Accordingly, a height dimension of the sheet 10 is somewhat less than the height of the sheet 9. The horizontal overlap spacing of the two unwound sheets 9 and 10 in the lower region is therefore somewhat less than the spacing of the two sheets 9 and 10 in the winding blind 1.

By design, the horizontal overlap spacing of the two sheets 9, 10 even with the cover elements or sheets 9, 10 partially wound up is also present or formed between the remaining sections of the nonwound sheets 9, 10. This also applies to the other sample embodiments described below.

Figure 3:
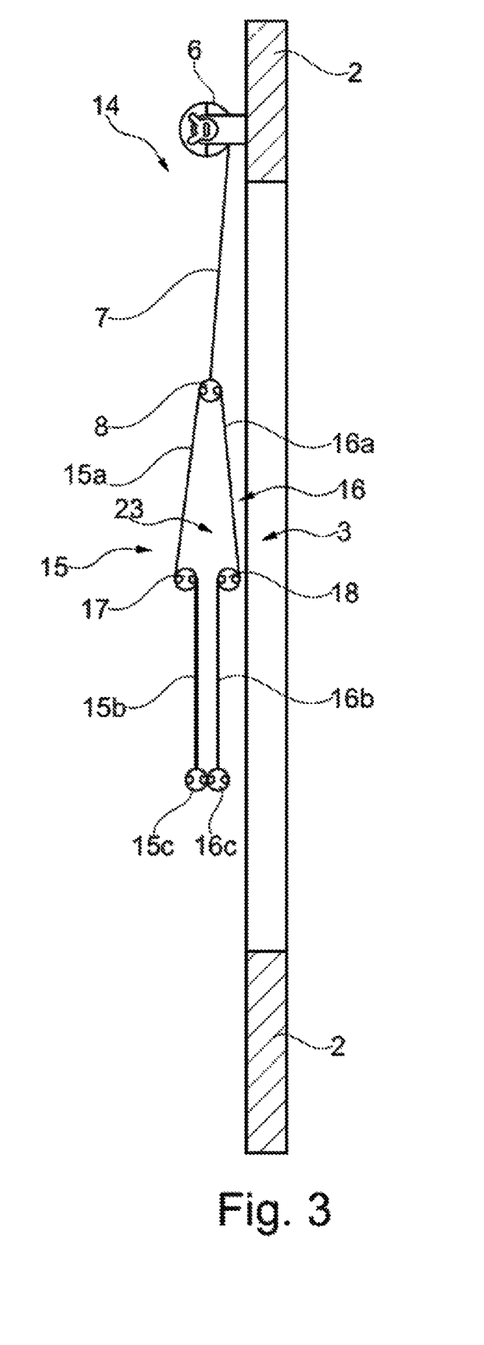
FIG. 3 shows another winding device according to the present invention in the view per FIGS. 1 and 2.

Another alternative winding blind 14 is shown in FIG. 3 from the side on a building wall 2. FIG. 3 shows a region of the building opening 3 open at bottom and top. The winding blind 14 here is configured as a so-called middle winding, which provides for a winding shaft 17 engaging with a front sheet 15 in the middle and a winding shaft 18 engaging with a rear sheet 16. The sheet 15 comprises an upper sheet segment 15a between the support pipe 8 and the winding shaft 17 and a lower sheet segment 15b between the winding shaft 17 and a lower edge reinforcement 15c. Accordingly, the rear sheet 16 has an upper sheet segment 16a and a lower sheet segment 16b with a lower edge reinforcement 16c. By rotating the winding shaft 17 about its lengthwise axis, the upper sheet segment 15a and the lower sheet segment 15b are accordingly wound up onto the winding shaft 17 and at the same time unwound from the winding shaft 17. Correspondingly, the sheet 16 with its two sheet segments 16a and 16b is at the same time wound onto the winding shaft 18 and unwound from it. The support pipe 8 at the upper ends of the sheets 15, 16 is correspondingly lowered or raised by unwinding or winding up of the tension element 7 with the winding body 6.

As compared to a single winding, such as shown by FIGS. 1 and 2, sheets can be wound up and unwound more quickly with the winding blind 14, which is advantageous when the heights of the sheets or the building openings are large.

Figure 4:
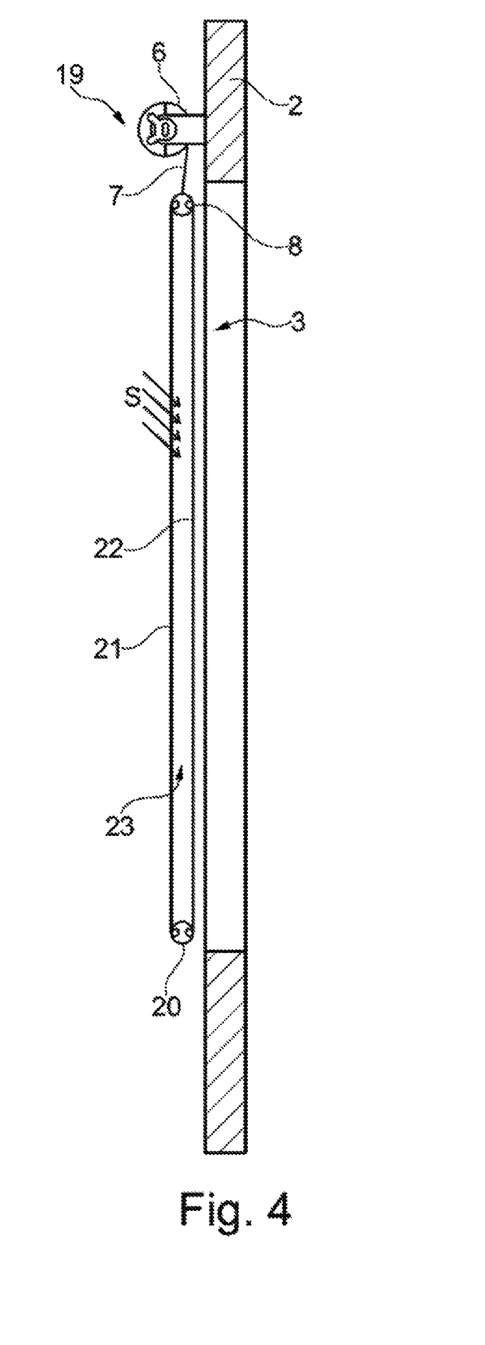
FIG. 4 shows a fourth winding device according to the present invention per the view from FIGS. 1 to 3.

FIG. 4 shows another alternative winding blind 19, which differs from the winding blind 1 of FIG. 1 in that precisely one winding element is provided, configured as a powered rotating winding shaft 20. Accordingly, a front sheet 21 and a rear sheet 22 are each fixed by their lower edge to the common winding shaft 20. The sheets 21, 22 are jointly and simultaneously wound onto and wound off from the winding shaft 20 by the turning of the winding shaft 20. The upper support pipe 8 with the upper edges of the sheets 21, 22 fastened to it is tracked in the manner described for the winding blind 1.

A material-free region 23 is present between the unwound, overlapping sections of the sheets 21, 22 per FIG. 4, which is configured as an air gap. The winding blinds 1, 13 and 14 also have corresponding regions 23 between the unwound overlapping respective sheets 9, 10 or 15, 16. The intermediate region 23 can be heated by incoming solar radiation S (indicated in FIG. 4), which comes in through the front sheet 9 or 15 or 21. The front sheets 9, 15 and 21 are therefore transparent, in particular, or permeable to light. The rear sheets 10, 16 and 22 are advantageously at least partly reflective on the inner side.

FIGS. 5, 6 and 7, 8 show two different drive arrangements 24 and 25, respectively, which can be used for the rotary drive of the two winding shafts 11, 12. The drive arrangements 24 and 25 of FIGS. 7 and 8 each have an electric drive motor 26 and 27 to transfer the torque to the winding shafts 11 and 12.

Figure 5:
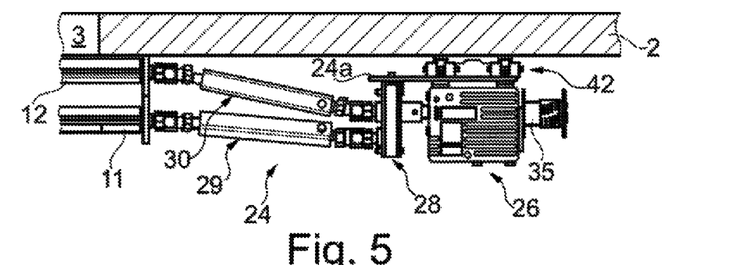
FIG. 5 shows a view of part of the winding device per FIG. 1 with a drive arrangement on a building wall, sectioned horizontally.
Figure 6:
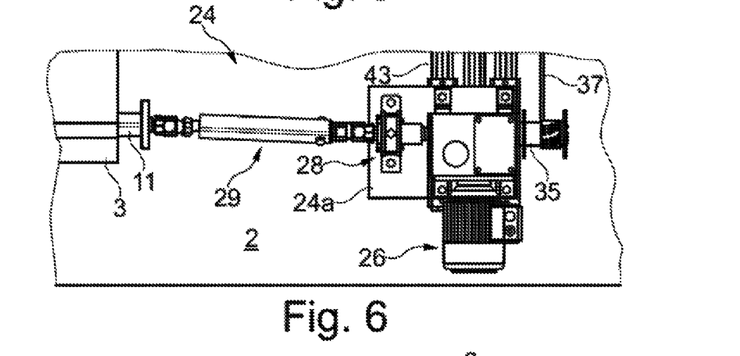
FIG. 6 shows the arrangement per FIG. 5 in a front view.

In the drive arrangement 24, a shaft segment of the drive motor 26 driven by motor at the takeoff side is connected to a rotating connection piece of a transfer box 28. The transfer box 28 has two identical rotating and outgoing stump shafts, which drive in rotation the winding shafts 11 and 12 across a connected telescopic coupling 29 and 30 when the drive motor 26 is switched on. The transfer box 28 is firmly mounted on a mounting plate 24a which can move vertically on the building wall 2, where the drive motor 26 is also secured.

Figure 7:
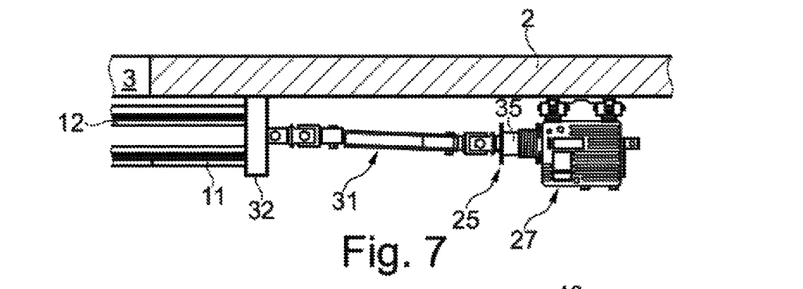
FIG. 7 shows a view per FIG. 5 with an alternative driving device.
Figure 8:
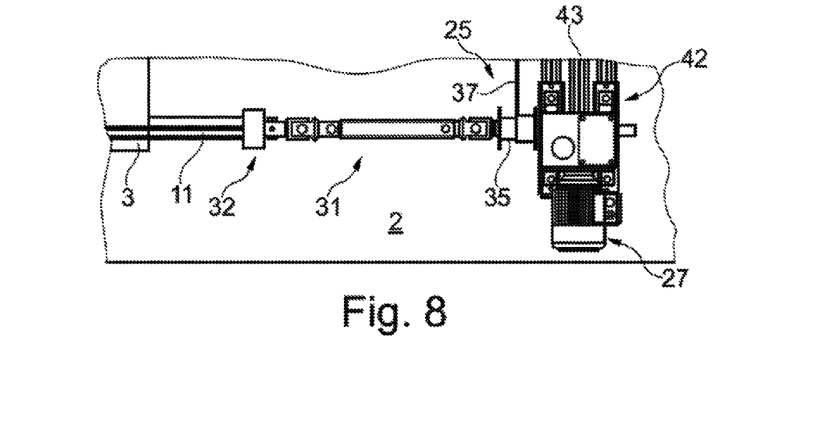
FIG. 8 shows the arrangement per FIG. 7 in a front view.

Alternatively to the drive arrangement 24, in the drive arrangement 25 the drive motor 27 is connected at the takeoff side to a telescopic coupling 31, which is connected by an end away from the drive motor 27 to a transfer box 32, whose two outgoing and rotating stub shafts are connected in rotational manner to the two winding shafts 11 and 12. The transfer box 32 is mounted overhung together with the two winding shafts 11, 12.

Figure 9:
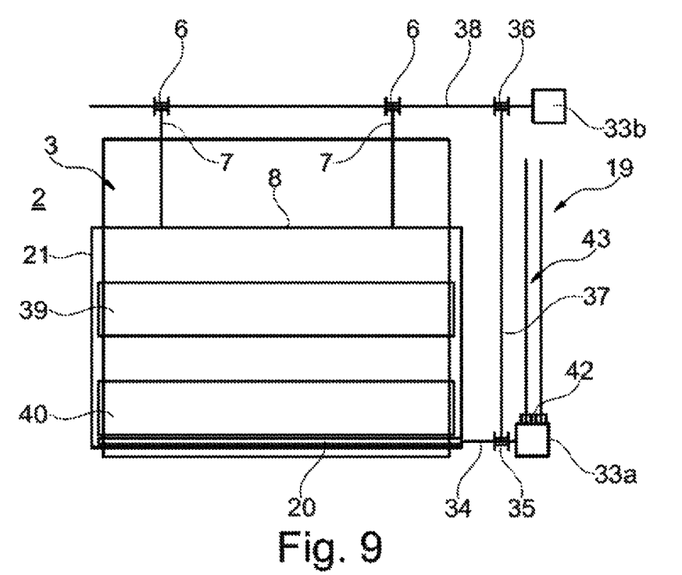
FIG. 9, greatly schematized, a front view of a winding device per FIG. 4 in a modified form.

FIG. 9 shows the building opening 3 on the building wall 2 not true to scale and heavily simplified in front view, where a single-winding winding device 19 per FIG. 4 is present with the sheets 21, 22 and the winding shaft 20 in modified form. The winding shaft 20 is driven with a drive motor 33a across a connection shaft 34. On the rotating connection shaft 34, in which a telescopic coupling (not shown) is integrated, for example, there is present a lower winding body 35, which is connected to an upper winding body 36 on a round profile 38 across a flexible tension element 37. The tension element 37 which can be wound around the winding body 35, 36, such as a steel cable, is wound up onto the winding body 36 as the sheets 21, 22 are unwound and unwound from the winding body 35, so that the winding shaft 20 remains at the same horizontal level. The round profile 38 above the building opening 3 is placed in rotation by an upper drive motor 33b in fixed position and thereby turns the winding body 6, while the wound-up tension elements 7 can be unwound from the winding bodies 7 and the support pipe 8 is lowered with the upper edges of the sheets 21, 22, as described. In this process, the covered building opening 3 is opened from above. For the closing of the building opening 3 from the bottom, the direction of rotation of the drive motors 33a, 33b is reversed and the sequences run in reverse order.

Figure 10:
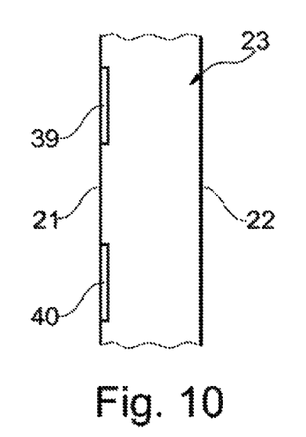
FIG. 10 shows a cutout of the cover element per FIG. 9 from the side.

In the front sheet 21, striplike heating elements 39 and 40 are worked in, running across the entire width of the sheet 21, being electrically operated for example and serving to heat the region 23 and the air gap between the sheets 21 and 22 (see FIGS. 9, 10).

Figure 11:
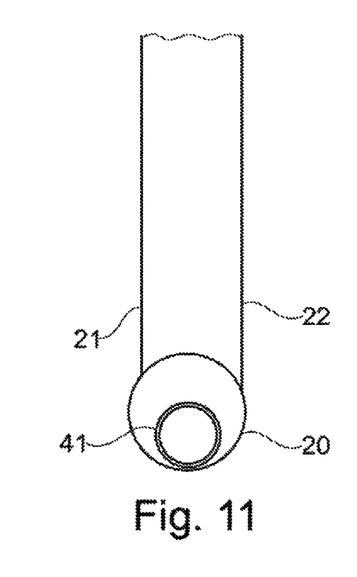
FIG. 11 shows a cutout from the side of a lower part of a winding device according to the present invention with a winding element and the cover elements, not wound up, engaging with it.

As an alternative option for the heating of the region 23, per FIG. 11 a heating hose 41 is accommodated in the hollow cylindrical winding shaft 20, configured as a pipe. The heating hose 41 can receive a flow of warm or hot heat transfer agent, so that the air gap region 23 is heated and the sheets 21, 22 are protected against icing and against freezing to the building wall 2.

For an arrangement which opens the building opening 3 from the bottom, the drive motor 33a per FIG. 9 or the drive motors 26 and 27 per FIGS. 5 to 8 are connected to a carriage arrangement 42, which can travel vertically along a carriage guide 43 secured firmly to the building wall 2 vertically upward and down again. For this, the respective drive motor can be tracked via the tension element 37 between the winding bodies 35 and 36.

LIST OF REFERENCE SYMBOLS

1 Winding blind
2 Building wall
2a Outside
3 Building opening
4 Opening edge
5 Opening edge
6 Winding body
7 Tension elements
8 Support pipe
9 Sheet
9a Edge
10 Sheet
10a Edge
11 Winding shaft
12 Winding shaft
13 Winding blind
14 Winding blind
15 Sheet
15a Sheet segment
15b Sheet segment
15c Edge reinforcement
16 Sheet
16a Sheet segment
16b Sheet segment
16c Edge reinforcement
17 Winding shaft
18 Winding shaft
19 Winding blind
20 Winding shaft
21 Sheet
22 Sheet
23 Region
24 Driving arrangement
24a Mounting plate
25 Driving arrangement
26 Drive motor
27 Drive motor
28 Transfer box
29 Telescopic coupling
30 Telescopic coupling
31 Telescopic coupling
32 Transfer box
33a Drive motor
33b Drive motor
34 Connection shaft
35 Winding body
36 Winding body
37 Tension element
38 Round profile
39 Heating element
40 Heating element
41 Heating hose
42 Carriage arrangement
43 Carriage guide

The invention claimed is:

1. A device for covering a building opening, the building opening having an upper edge and a lower edge, with a distance extending between the upper edge and the lower edge of the opening defining a height therebetween, the device comprising:

a flexible cover element configured to cover the building opening, a first winding element and a second winding element driven by at least one of a drive motor or a manual drive, the first and second winding elements configured to wind and unwind the cover element, the cover element including a first sheet having an upper edge and a lower edge, and a second sheet having an upper edge and a lower edge, the lower edge of the first sheet grasping the first winding element, and the lower edge of the second sheet grasping the second winding element, the first sheet and the second sheet being arranged on the respective first and second winding elements to fully unwind, thereby defining an unwound state, and wherein the first sheet and the second sheet are configured, in the unwound state, to overlap each other over an area of both sheets and cover the height of the building opening, with the upper edge of the first or the second sheet being located at the upper edge of the building, and the lower edge of at least one of the first or second sheet being located at the lower edge of the building opening.

2. The winding device according to claim 1, wherein the first sheet and the second sheet are further arranged in the unwound state with an air gap defined therebetween.

3. The winding device according to claim 1, wherein the upper edge of the first sheet and the upper edge of the second sheet grasp a common mounting.

4. The winding device according to claim 1, wherein the first sheet and the second sheet have essentially the same dimensions.

5. The winding device according to claim 4, wherein the first sheet and the second sheet have at least one of substantially similar light transparency or reflectivity.

6. The winding device according to claim 1, wherein the first and second winding devices are staggered relative to each other in at least one of a vertical or a horizontal direction when the first sheet and the second sheet are partially unwound.

7. The winding device according to claim 1, wherein the first winding element has a first vertical height above the lower edge of the building opening, the second winding element has a second vertical height above the lower edge of the building opening, and a connection between the one of the drive motor or the manual drive, the first winding element, and the second winding element are configured such that the vertical height of the first winding element and the vertical height of the second winding element change substantially simultaneously during winding thereof.

8. The winding device according to claim 1, wherein at least the first winding element can be driven in rotation with the at least one of the drive motor or the manual drive across a transfer box operating between the at least one of the drive motor or the manual drive and the at least the first winding element.

9. The winding device according to claim 1, further comprising a tracking unit, the tracking unit comprising a first tension element connected to an upper edge of the first cover element, and a second tension element connected to an upper edge of the second cover element, the first and second tension elements being configured to move the upper edges of the respective first and second sheets in a substantially vertical direction without being wound or unwound.

10. The winding device according to claim 1, wherein the first sheet and the second sheet are able to be at least partially heated.

11. The winding device according to claim 1, wherein at least one of the first sheet or the second sheet, closer to the building opening, is reflective.

12. The winding device according to claim 1, wherein at least one of the first winding element or the second winding element can be heated.

\* \* \* \* \*